Figure 1:
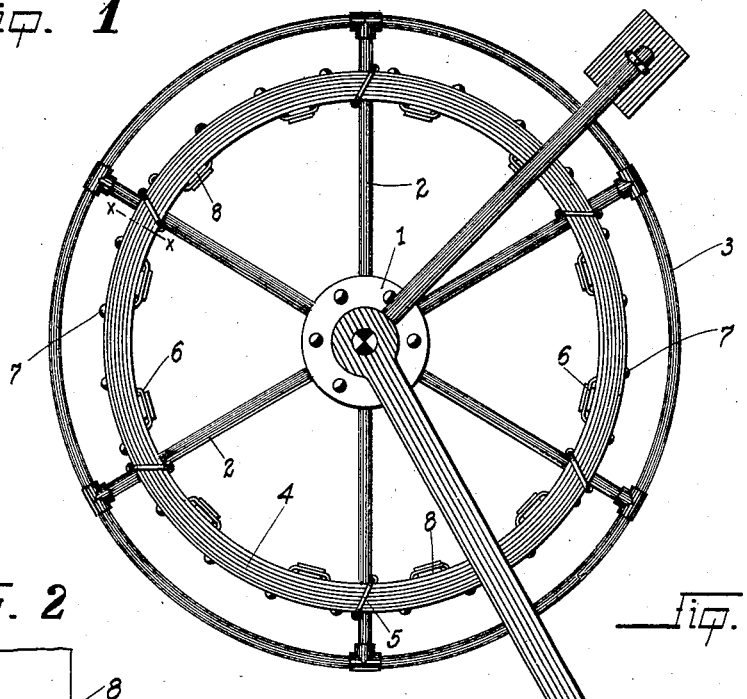

W. H. KEEN.
ROTARY HARROW.
APPLICATION FILED JUNE 1, 1909.

968,164.

Patented Aug. 23, 1910.

Witnesses

Inventor
Walter H. Keen
By
Attorney

UNITED STATES PATENT OFFICE.

WALTER H. KEEN, OF ACAMPO, CALIFORNIA.

ROTARY HARROW.

968,164.  Specification of Letters Patent.  Patented Aug. 23, 1910.

Application filed June 1, 1909. Serial No. 499,551.

*To all whom it may concern:*

Be it known that I, WALTER H. KEEN, a citizen of the United States, residing at Acampo, in the county of San Joaquin, State of California, have invented certain new and useful Improvements in Rotary Harrows; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in farming and vineyard implements, and particularly to harrows, the object of the invention being to produce a rotary harrow which will have cultivator and harrow teeth combined, such teeth being substantially hoe shaped and having a cutting edge on three sides, such teeth being fitted into a removable circular channel iron secured to the spokes of the harrow. Also to produce a weed cutter to be used in conjunction with said teeth, whereby the whole of said structure will readily act as a weed cutter, cultivator and harrow.

I also further aim to produce a simple and inexpensive implement for the purpose and yet one which will be effective for the purpose for which it is designed.

These objects I accomplish by means of a circular channel iron bolted by U-bolts to the top of the spokes of a rotary harrow, hoe shaped teeth clamped into said channel iron and being provided with a cutting edge of three sides, also removable weed cutters attached to said teeth, such weed cutters being circular in shape whereby the rotary movement of the harrow combined with its forward movement will cause said cutter to cut weeds and also to readily discharge them from the cutter. I also employ such other and further structure and relative arrangement of parts as will more fully appear by a perusal of the following specification and claims.

In the drawings similar characters of reference indicate corresponding parts in the several views.

Figure 2:
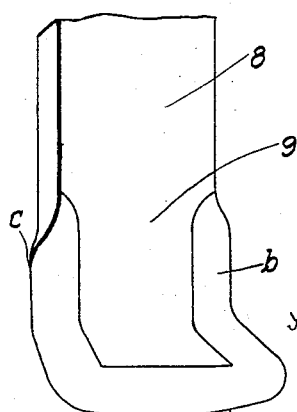
Figure 6:
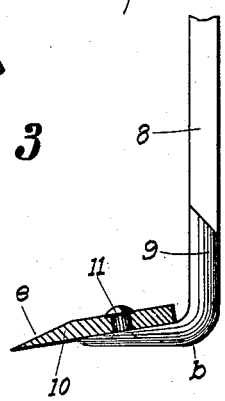
Figure 3:
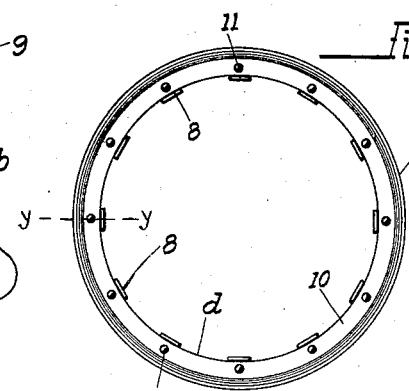
Figure 5:
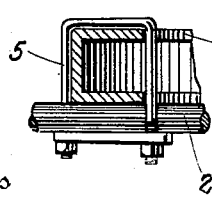
Figure 4:
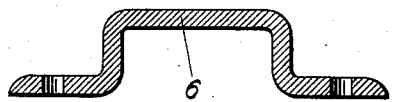

Figure 1 is a top plan view of the complete harrow. Fig. 2 is a perspective view of a harrow tooth. Fig. 3 is a top plan view of a weed cutting mechanism. Fig. 4 is a sectional view of a tooth clamp. Fig. 5 is a sectional view taken on line *x—x* of Fig. 1. Fig. 6 is a sectional view taken on line *y—y* of Fig. 3.

Referring now more particularly to the characters of reference on the drawings 1 designates the hub of the harrow, 2 the spokes and 3 the rim thereof.

4 is a circular channel iron of a lesser diameter than the diameter of the harrow and is secured on the top of the spokes by U-bolts 5, the channel of the channel iron 4 facing toward the hub of the harrow for the purpose as will appear.

Disposed in the channel irons 4 are U-clamps 6 secured by bolts 7, such clamps engaging the head or shank 8 of harrow teeth 9, such teeth being substantially hoe shaped and having three sharp edges, viz; "*a*" "*b*" and "*c*", the said harrow teeth projecting toward the periphery of the harrow and thus as the harrow rotates the said teeth both cut, cultivate and harrow the ground, thus giving the said harrow a three fold function.

10 represents a weed cutter which may be removably bolted to the base of the member 9 by a bolt 11, such weed cutter curving in a complete circle around the members 9 leaving the inner edge "*d*" free whereby the weeds may be cut and pass freely off of said cutter 10, the said cutter being provided with a sharp cutting edge "*e*."

The object of having the channel of the member 4 facing inward is to have the shanks 8 and clamps 6 and the nuts of the bolts 7 all inclosed away from the vines so as to prevent their striking the vines and breaking off the tender shoots, since the smooth outer surface of the member 4 and the rounded heads of the bolts are not so apt to knock or break the vines.

The object of having the member 4 secured to the top of the spokes 2 and within the circumference of the member 3 is to permit said member 3 to act as a guard to prevent the teeth from digging too deeply into the soil since said member 3 will maintain a position on the surface of the soil.

From the foregoing description it will be readily seen that I have produced such a device as substantially fulfils the objects of the invention as set forth herein.

While this specification sets forth in detail the present and preferred construction of the device still in practice such deviations from such detail may be resorted to as do not form a departure from the spirit of the invention.

Having thus described my invention what I claim as new and useful and desire to secure by Letters Patent is:—

1. A harrow comprising a hub, spokes and rim, a channel iron secured to the top of said spokes, and teeth secured to said channel iron.

2. A harrow comprising a hub, spokes and rim, a circular channel iron secured on the top of said spokes, said channel iron being of a lesser diameter than said rim, teeth secured in said channel iron, said teeth being substantially hoe shaped and being sharp on three sides.

3. A harrow comprising a hub, spokes and rim, a circular channel iron secured on the top of said spokes, said channel iron being of lesser diameter than said rim, teeth secured in said channel iron, said teeth being substantially hoe shaped and being sharp on three sides and a cutter blade removably secured to said teeth, and said blade curving from one to the other of said teeth and having its inner edge free, as described.

In testimony whereof I affix my signature in presence of two witnesses.

WALTER H. KEEN.

Witnesses:
   PERCY S. WEBSTER,
   WM. B. GRIFFIN.